June 18, 1929.  F. E. HUMMEL ET AL  1,717,979
BREAD TOASTER
Original Filed Feb. 14, 1924  5 Sheets-Sheet 1

Inventors;
F.E.Hummel
J.J.Noeth.
Attorneys.

June 18, 1929.  F. E. HUMMEL ET AL  1,717,979
BREAD TOASTER
Original Filed Feb. 14, 1924  5 Sheets-Sheet 2

Inventors
F.E.Hummel.
J.J.Noeth.
Milo B. Stevens Co.
Attorneys

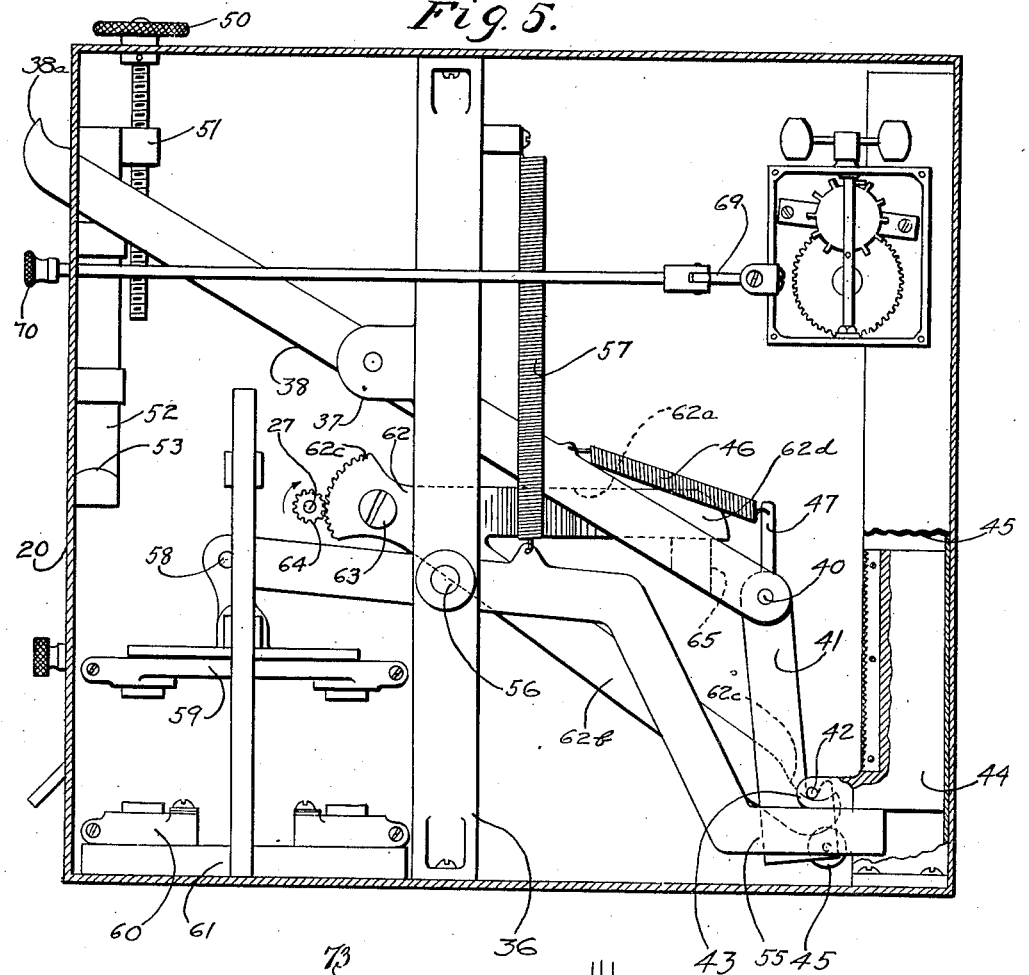

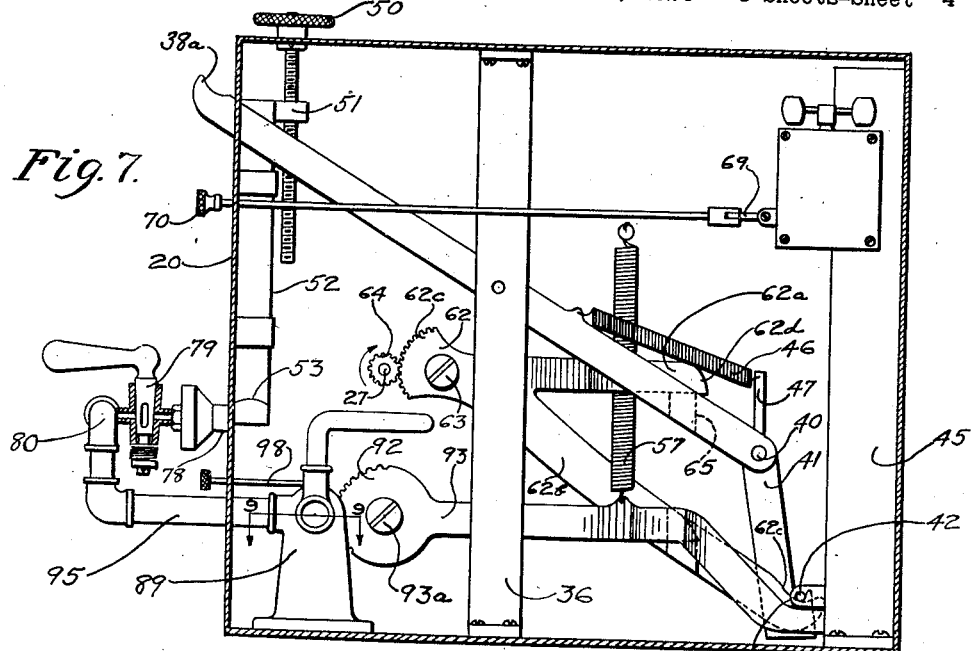

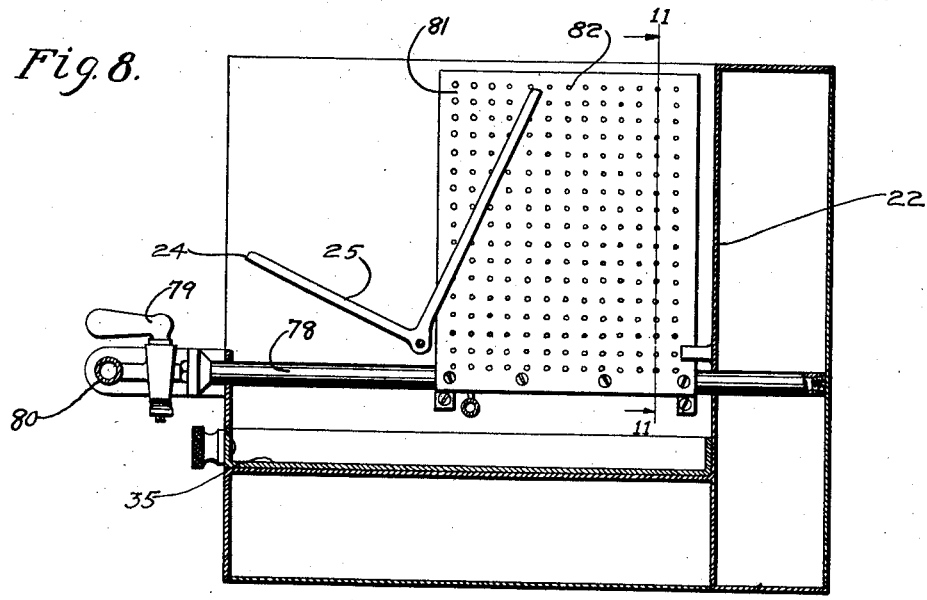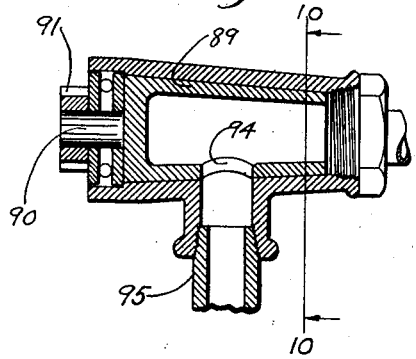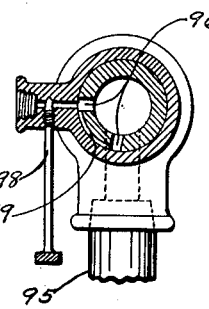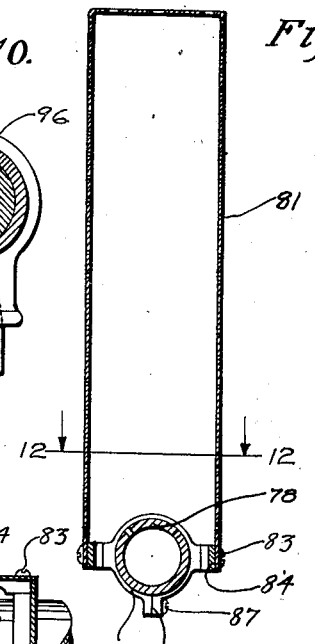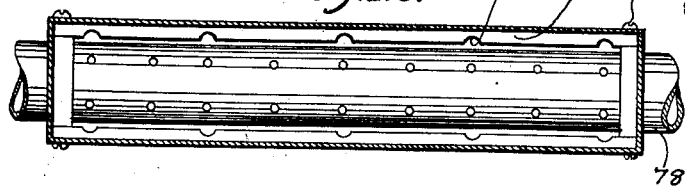

Patented June 18, 1929.

1,717,979

UNITED STATES PATENT OFFICE.

FREDERICK E. HUMMEL AND JOHN J. NOETH, OF CHICAGO, ILLINOIS.

BREAD TOASTER.

Application filed February 14, 1924, Serial No. 692,774. Renewed November 12, 1928.

This invention relates to bread toasters used in restaurants, lunch rooms and the like, and has for its object to provide a simple and compact apparatus for this purpose which automatically controls the toasting operation.

Another object of the invention is to provide an apparatus which, while primarily designed to use electricity as fuel, may with a few changes be modified to use gas.

A further object of the invention is to produce an apparatus of high efficiency at minimum cost as distinguished from a more elaborate structure on which we have filed an application dated February 4, 1924, Serial No. 690,580. As we are employing certain elements in the present application that were introduced by the one on file, we will take occasion to refer to the latter in that connection from time to time, to save repetition.

Other objects of the invention will suggest themselves from the description to follow, reference being had to the accompanying drawings, in which Figure 1 is a front elevation of the device, as designed for electricity;

Figure 2:
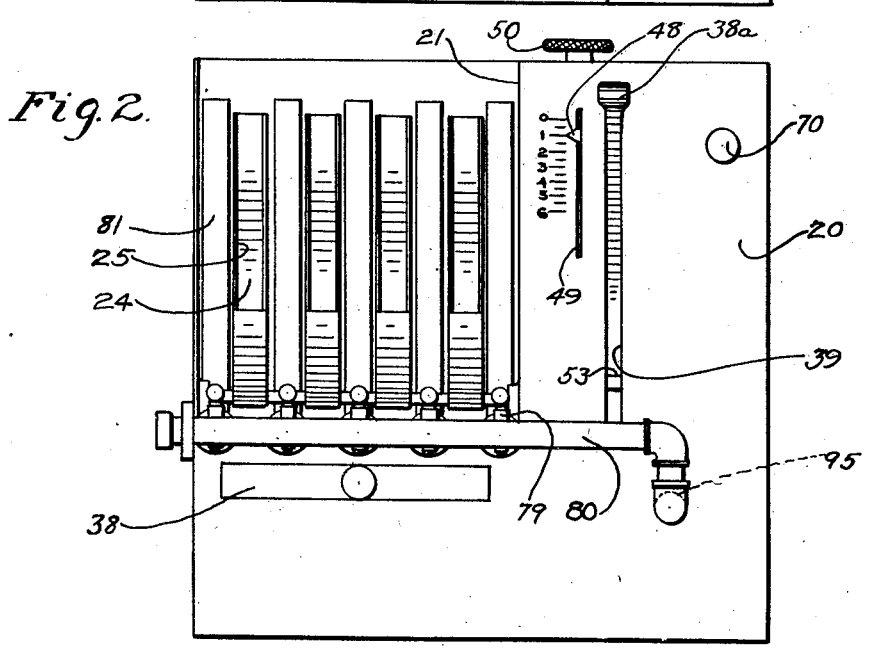
Fig. 2 is a similar view of the same, as modified for gas.
Figure 3:
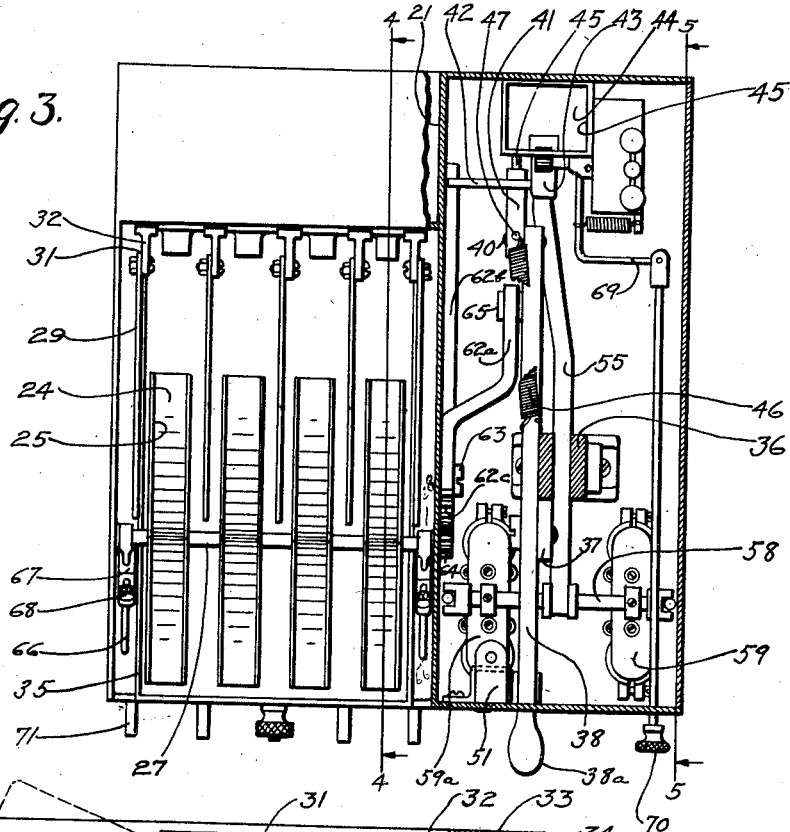
Fig. 3 is a plan view of the structure of Fig. 1, partly in section, electrical wiring being omitted to avoid confusion.
Figure 4:
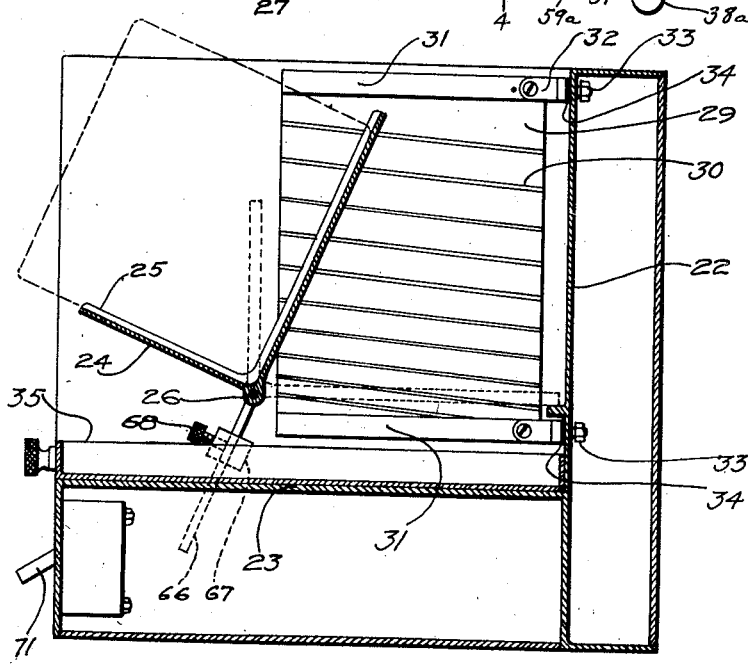

Figs. 4 and 5 are, respectively, sections taken on the lines 4—4 and 5—5 of Fig. 3;

Fig. 6 is a plan view of the structure of Fig. 2, partly in section;

Figs. 7 and 8 are, respectively, sections on the lines 7—7 and 8—8 of Fig. 6;

Fig. 9 is a horizontal section of a master gas valve;

Fig. 10 is a section on the line 10—10 of Fig. 9;

Fig. 11 is a detail section on the line 11—11 of Fig. 8;

Fig. 12 is a section on the line 12—12 of Fig. 11; and

Fig. 13 is a diagram of the wiring used in the electrically-fired structure.

Referring specifically to the drawings, 20 denotes the housing for the apparatus, which is of heavy sheet metal suitably joined and fitted, and substantially cubic in form. The housing is divided vertically by a partition 21 from the front to the rear, and by a partition 22 from the partition 21 to the left-hand side wall as viewed in Fig. 3. The top and front wall of the housing are cut away at the left-hand side as viewed in Figs. 3 and 4 to expose the partitions down to a low deck 23, which serves as a secondary top or closure.

In the space left open are disposed the bread-slice holders with electrical heating units between them. As shown more clearly in Figure 4, each slice holder consists of an angle strip 24, marginally flanged at 25, and reinforced at 26 at the angle to receive a transverse spindle 27 which is driven through the angles of all the holders to tilt them uniformly in case the spindle is rocked. Four slice holders are shown but the apparatus may be built with any number of holders, according to the capacity wanted. The spindle 27 is journaled in bearings 28 mounted inside the left-hand wall (Fig. 3) and the partition 21, and passes through the latter to receive actuating connections, as will appear later. The holders are normally in the full-line position of Figure 4 which is receptive to the insertion of one or more bread slices as denoted by large dotted lines. An inward tilt of the series of holders to the position denoted by fine dotted lines places the bread slices in readiness for toasting by the electrical units positioned therebetween. These comprise vertical sheets 29 of mica wrapped with electrical-resistance wire 30. The sheets have upper and lower supports 31, hung from brackets 32 attached to the partition 22 and forming binding posts 33 on the opposite side thereof, with insulation strips 34 interposed. It will thus be seen that the slices are inserted at a point remote from the heating units, so that the fingers are in no danger whatever from that source; yet, a short movement of the slice holders—after the hand is away—places each slice fully opposite a heating unit of large area on each side, so that both sides of the slice are toasted at the same time. Thus, the slices are toasted uniformly and quickly, which is an item of value in establishments combining quality with quick service.

The mechanism for the automatic operation of the slice holders and the control of the heating units—save for the primary actuating means—is entirely enclosed in the balance of the housing. Hence, crumbs or chips apt to drop from the bread slices during insertion or removal—the holders in the latter instance having returned to normal position—cannot fall into the mechanism to clog or litter the same. As in our prior application above referred to, a tray 35 is slid upon the deck 23 to catch all such droppings.

Now taking up the internal mechanism, it is noted that a post structure 36 is stationed at a medial point within the right-hand compartment of the housing as viewed in Fig. 3. On an offset 37 of this structure is fulcrumed a long lever 38, the fore part of which extends forward through a slot 39 in the front wall of the housing to form a handle 38$^a$. The inner end of the lever has pivotally connected at 40 a pendent hook 41, which engages a pin 42 carried by a forward projection 43 of a weight block 44 vertically slidable in a shaft 45. It will now be obvious that to depress the handle portion 38$^a$ of the lever 38 will act to lift the weight 44 in its shaft, and that a return motion will result upon a release of the handle, by force of the weight. In order that the hook 41 may always hold to the weight, it is forked at the bottom to receive a roller which is designed to bear against the face of the shaft 45 by force of a spring 46 leading from the lever 38 and drawing on a lug 47 extending from the hook 41 beyond its pivotal point 40. The purpose and action of the weight 44, its lifting means, its shaft 45 and attendant parts shown are identical with the purpose and action of similar parts in our pending application referred to, so that it may now be summarized that the lever 38 is the time-control element of the mechanism. As the time-control means in our said application required a setting for desired periods of action, so it does in the present instance, the setting now being lineal rather than rotary.

Figure 1:
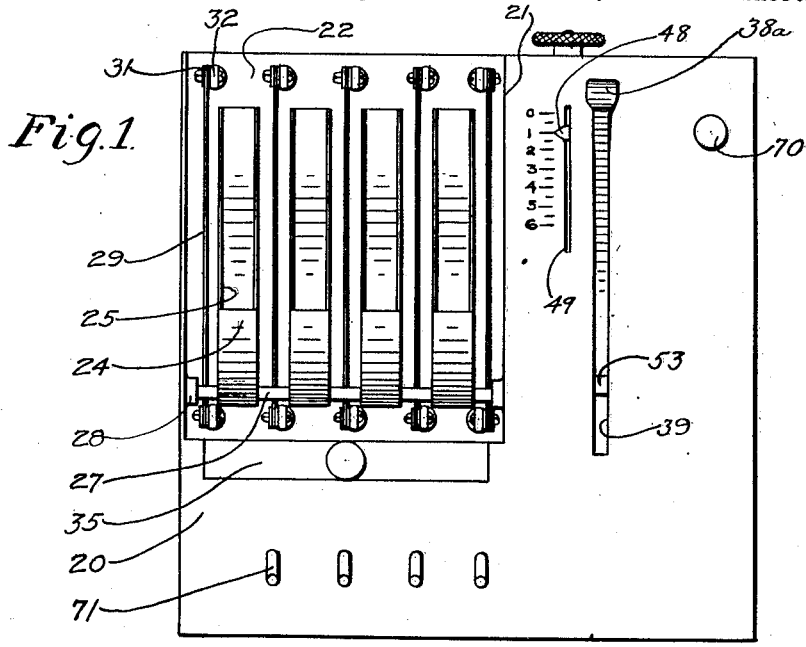

The setting referred to is denoted by the vertically numbered graduations apparent in Figure 1, these of course representing minutes, as in the previous case. The position of a pointer 48 opposite these, as it travels in a vertical slot 49 in the front wall of the housing, is determined by a hand-screw 50 upon which a traveling nut 51 forming the inner part of the pointer is screwed. The nut 51 extends downwardly to form a slide 52 terminating in a side-lug 53, and operable in bearings 54 mounted inside the housing wall. As the lever 38 is movable alongside the slide 52 and is limited by the side lug 53, it will be obvious that the depression of the lever will vary with the setting of the slide, and that the descent of the weight will be timed accordingly.

The weight receives a follower bar 55 underneath, this bar being fulcrumed at 56 in the post structure 36. The rear portion of the bar is drawn upwardly by a light coil spring 57, so that the bar may serve its purpose of following the weight; and the fore part of the bar carries a cross shaft 58 from which are hung two switch contact heads 59 and 59$^a$ for the bridging of terminals 60 in an insulation base block 61 below. As this switch structure is given more detail in the pending application referred to, suffice it to say that the use of the weight 44 permits the switch to rock into contact and put the electrical heating units in action. The electrical circuit involved in this action will be described later.

It will be recalled that the bread-slice holders 24 were described as being in their normal or receptive position per full-line showing in Figure 4, and that they received a rearward rocking stroke to the dotted-line position in the same figure, in order to position the bread slices at the toasting site. This stroke is caused by the lever 38 when its handle 38$^a$ is depressed; and the return stroke is caused by the weight 44 during its descent, so that the action of the slice holders is entirely automatic and does not require manual attention.

The element through which motion is imparted to the slice holders is a Y-shaped lever 62 having branches 62$^a$ and 62$^b$. The lever is positioned with its base next to the partition 21 and pivoted at 63 to the latter. The profile of the lever base 62 is cut with gear teeth 62$^c$ for engagement with a pinion 64 mounted on the inner end of the spindle 27 which is for this purpose extended into the mechanism compartment. The lever branch 62$^a$ is given a lateral offset toward the right to lie in the path of a side lug 65 carried by the lever 38; and the upper edge of its extremity is rounded, as shown at 62$^d$ for a purpose soon explained. The branch 62$^b$ terminates near the rear wall of the housing with a top depression 62$^e$ to seat the side pin 42 carried by the projection 43 of the weight 44.

Now, when the lever 38 is depressed, its side lug 65 will rise and push up the branch 62$^a$ of the lever 62. This motion will be transmitted through the gear profile 62$^c$ and pinion 64 to the spindle 27 to turn in the direction of the arrow in Figure 5, and swing the slice holders to the rear as previously described. Continuing on its upward course, the lug 65 will ride off the end of the lever branch 62$^a$. This does not mean, however, that the latter will drop, as the slice holders will by this time have swung beyond the vertical plane of their axis, so that the force of their weight—plus that of any bread slices with which they may be loaded—will cause the lever branch 62$^a$ to continue its rise together with the branch 62$^b$, until the slice holders reach their point of rest in toasting position, branch 62$^b$, branch 67$^b$ merely acting as a follower of the weight 44. It will be seen that the gradual top depression 62ᵉ of the branch 62ᵇ will facilitate the moving of the latter, through change of angularity, upon the pin 42. Thus, the slice holders may be assumed to have reached their inner swinging limit, while the weight continues to rise to the extent governed by the lever 38.

Upon the release of the lever handle 38ᵃ, the weight will begin to descend very slowly, due to the governing action of the gearing at the upper part of the shaft 45, as described in the pending application referred to, so that the affected mechanism will be still and the bread will undergo the toasting operation. The continued descent of the weight will cause it, at a suitable time, to again get in touch with the switch bar 55 and through the pin 42 with the lever branch 62ᵇ, whereby to start these parts on their return stroke. By this time the weight becomes freed of the governing mechanism, and drops quickly to the bottom of the shaft, causing a return of the affected parts to original position. The bread slices are thus ready for removal, the current is cut off, and the side lug 65 of the lever 38 has ridden over and slipped off the curved end 62ᵈ of the lever branch 62ᵃ to underlie the latter as before.

In order that the weight 44 may be made light to reduce stress and shock in the mechanism, the slice holders 24 may be counter-balanced as shown in Figures 3 and 4. The counter-balancing element consists of two stems 66 mounted with one of their ends on the spindle 27, and extending in a direction opposite from that of the rear arms of the slice holders. The stems carry sliding weights 67 provided with set screws 68 to station the weights where they will almost balance the array of slice holders on the spindle 27. The weight 44 could therefore be made lighter, having to lift but the weight of the slices and the slight extra weight of the slice holders. It will be understood that the latter and their weights 67 should not be evenly balanced, as there would be a tendency for the Y-shaped lever 62—as light as it might be—to drop as soon as the side lug 65 of lever 38 moved off the lever 62 on the up-stroke, thereby causing the slice holders to swing back to forward position.

Precisely as in our pending application, an emergency weight release lever 69 is also provided in the present instance, the same having an external finger knob 70. Also, the electrical switch pegs or buttons 71 will be noted as in the previous case, these being shown depressed to indicate that the gaps in the circuit which they control are closed. Any of the pegs may, of course, be raised to cut out the electrical heating unit it represents, in case some of the slice holders are not loaded.

The operation of the electrical circuit diagrammatically shown in Figure 13 may be summarized as follows: One terminal of the first switch peg 71 is connected by a conductor 72 to one terminal of the first two heating units 30; and the corresponding terminal of the other three pegs is likewise applied to the respective terminals of the remaining heating units 30. The other terminals of these units are joined into a conductor 73 leading to the power service mains. The other terminal of the first switch peg is joined to a conductor 74 leading to one terminal of the bridge switch 59; and the remaining switch pegs receive similar connections through a conductor 75 to one terminal of the bridge switch 59ᵃ. The opposite terminals of the bridge-switches are connected through conductors 76 and 77, respectively to the power service mains. This circuit is somewhat peculiar in that it employs two bridge switches where ordinarily one would suffice. The use of two switches is to distribute the amount of wear and pitting of the carbon contact points. Thus, if but one slice of bread is to be toasted at a time, two heating units 30 will be required and one bridge-switch used; and the other switch will receive no use or wear in an electrical sense until a greater demand is made for toasting service.

Now, taking up the modification of Figures 2, and 6 to 12 inclusive, it will be noted that the electrical heating units have been replaced by an array of gas burner tubes 78, with valves 79 leading from a manifold 80, these parts following standard lines. Each tube 78 carries a flame shield 81, which is a sheet metal enclosure dotted with perforations 82, and fastened by screws 83 at the bottom to a rectangular frame 84 having rings 85 at the ends which clamp the pipes by being split at the bottom as shown at 86, and receiving screws 87 thereat. The sides of the frame 84 are notched at 88, opposite the pipes to admit air to the burners.

The manifold 80 leads from a master valve 89 situated inside the mechanism compartment as a substitute for the bridge-switch structure in the electrical embodiment. The master valve is of the plug type, and its stem 90 receives a pinion 91 meshing with the toothed profile 92 of a bar 93, which otherwise functions as the equivalent of the bar 55 in the electrical embodiment, except that the pivot 93ᵃ is in the partition 21 instead of in the post structure.

It will thus be understood that the master valve 89 is operated automatically in either direction to supply gas to the manifold 80 or to shut it off. The valve plug 89 is hollow, and has a side opening 94 for communication with a pipe 95 leading to the manifold. The plug also has a smaller opening 96 to lead gas constantly into a pilot tube 97 which extends under the burner tubes 78 and lights them when the gas is turned on.

As is the usual practice, the pilot tube is controlled by a needle valve 98; and an annular duct 99 connects the plug openings 94 and 96 to keep the pilot tube from being cut off when the valve is opened for service.

It is thus evident that our automatic toaster can be designed to serve with equal facility establishments using electricity or gas, as the case may be. The preferred construction of the toaster has been illustrated, but it will be understood that many changes or refinements might be made without departing from the spirit and scope of the invention.

We claim:

1. In a toaster having a timing weight and a plurality of holders; a shaft supporting the holders for movement about a horizontal axis, said holders being provided with stems, counterbalancing weights on said stems, a pinion on said shaft, a lever having a gear segment adjacent one end and engaged with said pinion, the other end of said lever being normally engaged by said weight to hold said carriers out of toasting position, said lever having a branch, and a weight lifting lever having means to engage said branch to lift the same simultaneously with the elevation of the weight.

2. In a bread toasting machine having a timing weight and a timing mechanism for controlling the descent of said weight; a series of bread-slice holders mounted on a rock-shaft, an operating lever having a lifting hook for engagement with said weight to raise the weight when the operating lever is depressed, a side lug on the lifting end of the operating lever, an arm impelled by the rise of said lug and geared to the rock-shaft to effect a rearward tilt of the slice holders and an offset of said arm acting as a follower of the timing-weight on the up-stroke thereof.

3. In a toasting machine having a timing-weight, a weight lifting lever, a movable bread slice holder, rock shaft operatively connected to the holder for moving the same to and from toasting position; the combination of a gear on said rock shaft, a swingingly mounted arm having a gear segment at one end in operative engagement with said rock shaft gear, the other end of said arm being normally engaged by said weight to maintain the carrier out of toasting position, a branch carried by said arm and adapted to be engaged by a portion of said weight lifting lever when the same is actuated whereby said arm will be rocked to actuate said carrier to toasting position.

4. In a toasting machine, a movable bread slice holder, a rock shaft operatively connected to the slice holder for actuating the same to and from toasting position, a gear on said rock shaft, a swingingly mounted arm having a gear segment at one end and engaging said gear, yielding means normally acting upon said arm and tending to hold the same in a position to maintain the slice holder out of toasting position, and an operating lever for swinging said arm against the action of said yielding means to actuate the slice holder to toasting position.

5. In a toasting machine, a movable bread slice holder, a rock shaft operatively connected to the slice holder for actuating the same to and from toasting position, a Y-shaped lever having an operative engagement with said rock shaft for swinging the same to actuate the slice holder to and from toasting position, yieldable means normally engaging one branch of said lever to maintain the same in a position to hold the slice holder out of toasting position, and a manually operable lever engageable with the other branch of said Y-shaped lever to actuate the same to move the slice holder to toasting position.

6. In a toasting machine, a carrier, means pivotally supporting said carrier whereby the latter will drop to a point of rest at either side of its pivot when moved past its center of gravity and released, a rock shaft having an operative connection with said carrier, a gear on the end of said rock shaft, a lever pivotally mounted and having a gear segment in constant engagement with said gear to oscillate said shaft and to control the movement of said carrier, said lever having a branch adapted to be engaged by a weight or other displaceable means, a pivoted manually operable lever having a lug, said first mentioned lever having a second branch with which said lug engages when the second lever is moved in a predetermined direction, whereby to rock said carrier past its center of gravity toward toasting position so that it may drop of its own weight to its point of rest, and the relative arrangement of the pivot points of the first and second levers being such that the second lever lug will disengage from the second branch shortly after the carrier has past its center of gravity moving toward toasting position, whereby said first lever need partake of but a limited movement under the influence of said second lever and whereby the second lever may have a relatively long movement for any purpose desired.

In testimony whereof we affix our signatures.

FREDERICK E. HUMMEL.
JOHN J. NOETH.